United States Patent [19]
Gaudette et al.

[11] Patent Number: 5,764,542
[45] Date of Patent: Jun. 9, 1998

[54] NOISE FILTERING UTILIZING RUNNING AVERAGE

[75] Inventors: Marvin F. Gaudette, Rockton; Kimble A. Vitkus, Sycamore, both of Ill.

[73] Assignee: Eaton Corporation, Cleveland, Ohio

[21] Appl. No.: 584,902

[22] Filed: Jan. 11, 1996

[51] Int. Cl.$^6$ .................................................. H04B 15/02
[52] U.S. Cl. ................................. 364/574; 395/200.32
[58] Field of Search ........................ 364/557, 571.01, 364/574, 575; 34/318, 445, 321, 524; 236/91 F; 237/2 R; 374/101, 103, 116, 185; 395/200.32

[56] References Cited

U.S. PATENT DOCUMENTS

| | | |
|---|---|---|
| 4,286,391 | 9/1981 | Gerry ........................................ 34/543 |
| 4,475,158 | 10/1984 | Elias ..................................... 364/413.12 |
| 4,531,305 | 7/1985 | Nagayasu et al. ......................... 34/445 |
| 5,347,727 | 9/1994 | Kim ........................................ 34/491 |

*Primary Examiner*—James P. Trammell
*Assistant Examiner*—Thomas Peeso

[57] ABSTRACT

A system and method for reducing the amount of electrical noise in a signal produced by a temperature sensor for an appliance which utilizes a running average calculation to provide a more accurate sensor reading in an inexpensive and efficient manner. Consecutive readings obtained by the sensor are digitized and stored in a circular buffer. A running average of the readings stored in the buffer is made upon each new reading and the concurrent erasure of the oldest reading.

10 Claims, 2 Drawing Sheets

NOISE FILTERING UTILIZING RUNNING AVERAGE

BACKGROUND AND SUMMARY OF THE INVENTION

This invention relates generally to noise suppression in sensor data and, more particularly, to a temperature sensor for an appliance which utilizes a running average of temperature indications to reduce the effects of induced electrical noise on a resultant temperature reading.

Electronically based sensors wherein raw data obtained by the sensing element is passed to a microprocessor for generating a calibrated sensor reading are available in many forms and are used in a variety of applications. One such sensor of this type, which will serve as a context in which the present invention will be described, is an exhaust air temperature sensor for a clothes dryer. In this instance the sensing element is a thermistor which has an electrical resistance which varies with temperature. A voltage across the thermistor is carried as an analog signal over an electrical line to a connected microprocessor where it is digitized and converted into a calibrated temperature reading. This reading is used by the microprocessor to control the dryer heating elements to produce a dryer temperature which falls within a desired range.

In such devices, however, it is common for the dryer motor and other nearby electrical devices to induce electrical noise in the transmitted analog signal, thereby corrupting the raw data and possibly causing an erroneous temperature reading. Such an erroneous reading can result in a drying temperature above or below the desired temperature and thereby lead to customer dissatisfaction. This problem is compounded by the required placement of the sensor in the exhaust air manifold, at a distance from the microprocessor, since such noise typically increases with transmission line length.

One of the ways previous devices of this type have attempted to compensate for this noise is by temporarily storing batches of raw data in memory and then taking an average of the stored data. Other devices, such as that disclosed in U.S. Pat. No. 5,412,590 to Gaudette et al., assigned to the assignee of the present invention and incorporated herein by reference, further calculate statistical variances in the stored sets of readings. While these methods are effective in limiting the adverse effects of noise in such systems, they put a greater demand on the microprocessor. This can be a disadvantage in devices such as a clothes dryer wherein present market conditions require that cost, especially in dryer electronic controls, be minimized in every way possible.

The present invention is thus directed toward providing a simple and cost effective way to reduce the effects of electrical noise on data obtained from a sensor such as a dryer exhaust air temperature sensor. To accomplish this, consecutive readings obtained by a thermistor placed in an exhaust air manifold of a clothes dryer are digitized and stored in a "circular" buffer. A running average, rather than a discrete average, of the readings stored in the buffer is made upon the storage of each new reading and the concurrent erasure of the oldest reading. This enables fast, stable and efficient error reduction which requires minimum expense in terms of required microprocessor power.

These and other features and advantages of the present invention will become apparent to one having skill in the art upon review of the following description taken in conjunction with the accompanying drawings.

DETAILED DESCRIPTION OF THE PREFERRED EMBODIMENT

Figure 1:
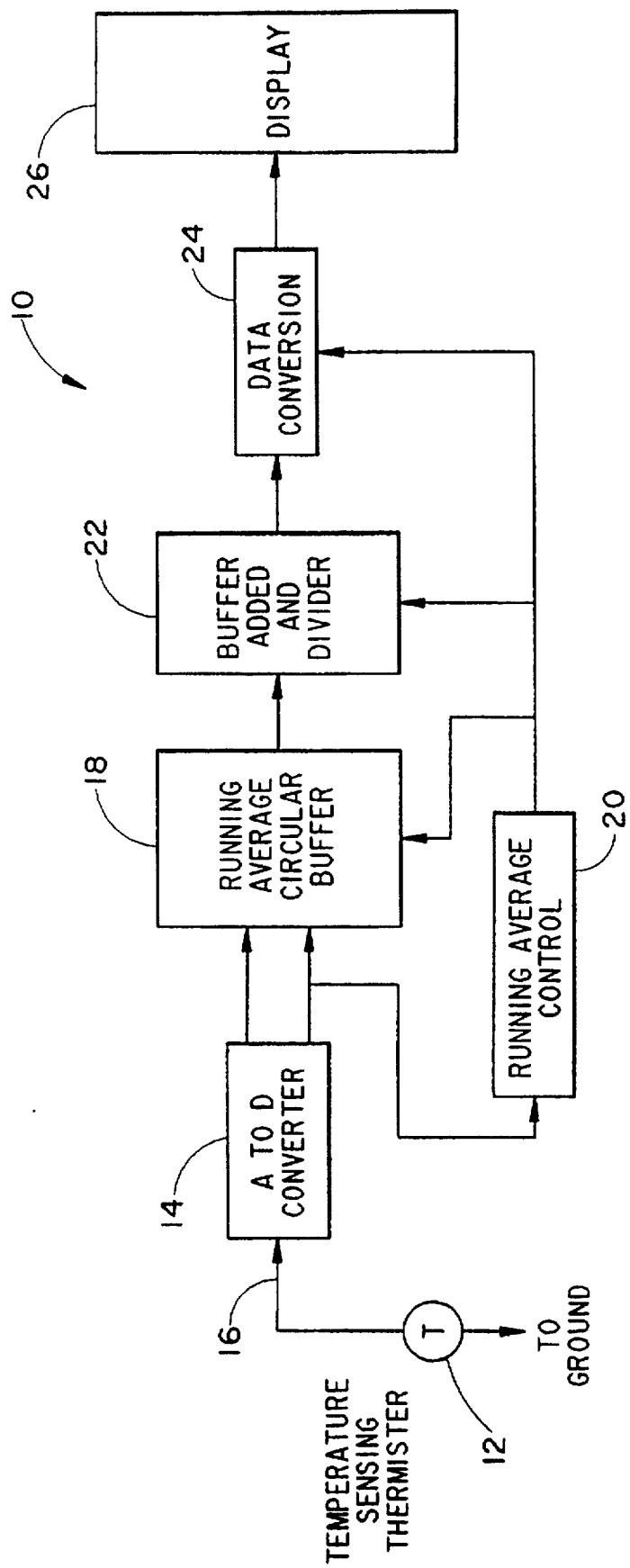
FIG. 1 schematically illustrates the electronic temperature sensor of the present invention.

Turning now to the drawings, and in particular to FIG. 1, the clothes dryer exhaust air temperature sensor of the present invention is indicated generally at 10. A sensor element, in the form of a thermistor 12 is electrically connected between ground and an analog to digital (A/D) converter 14 by a lead 16. Signals indicative of the temperature, such as the temperature related voltage measured at thermistor 12, or such as are produced by any equivalent sensor element, are transmitted as an analog electrical signal over lead 16. The sensor readings change over time and are preferably periodic, either as a series of consecutive readings produced by the sensor or as discrete samples taken from a continually variable signal.

Thermistor 12 is preferably positioned in the dryer exhaust air manifold with A/D converter 14 typically positioned from one to as many as three feet away. The outputs of A/D converter 14 are electrically coupled to a running average circular buffer 18, in the present exemplary embodiment an 8-bit buffer, used to store raw digitized temperature indicating measurements obtained by sensor 12. The pointer used to create the circular buffer is controlled by a running average control module 20 which also provides control signals to the adder and divider buffer 22 which in turn provides memory space for intermediate calculations in the averaging process.

A data conversion block 24 preferably converts the averaged raw data (in the case of a thermistor a resistance related value such as voltage) into a calibrated temperature reading. This calibrated reading can be sent to a display 26 or any other suitable output such as to a controller which directly impacts the application of heat to the dryer. A/D converter 14, circular buffer 18, controller 20, buffer 22 and data conversion block 24 are preferably resident in a single microprocessor but could alternately be implemented in any suitable manner. Also, a different type of sensor which produces a calibrated reading directly could alternately be used, thereby eliminating the need for data conversion block 24.

Figure 2:
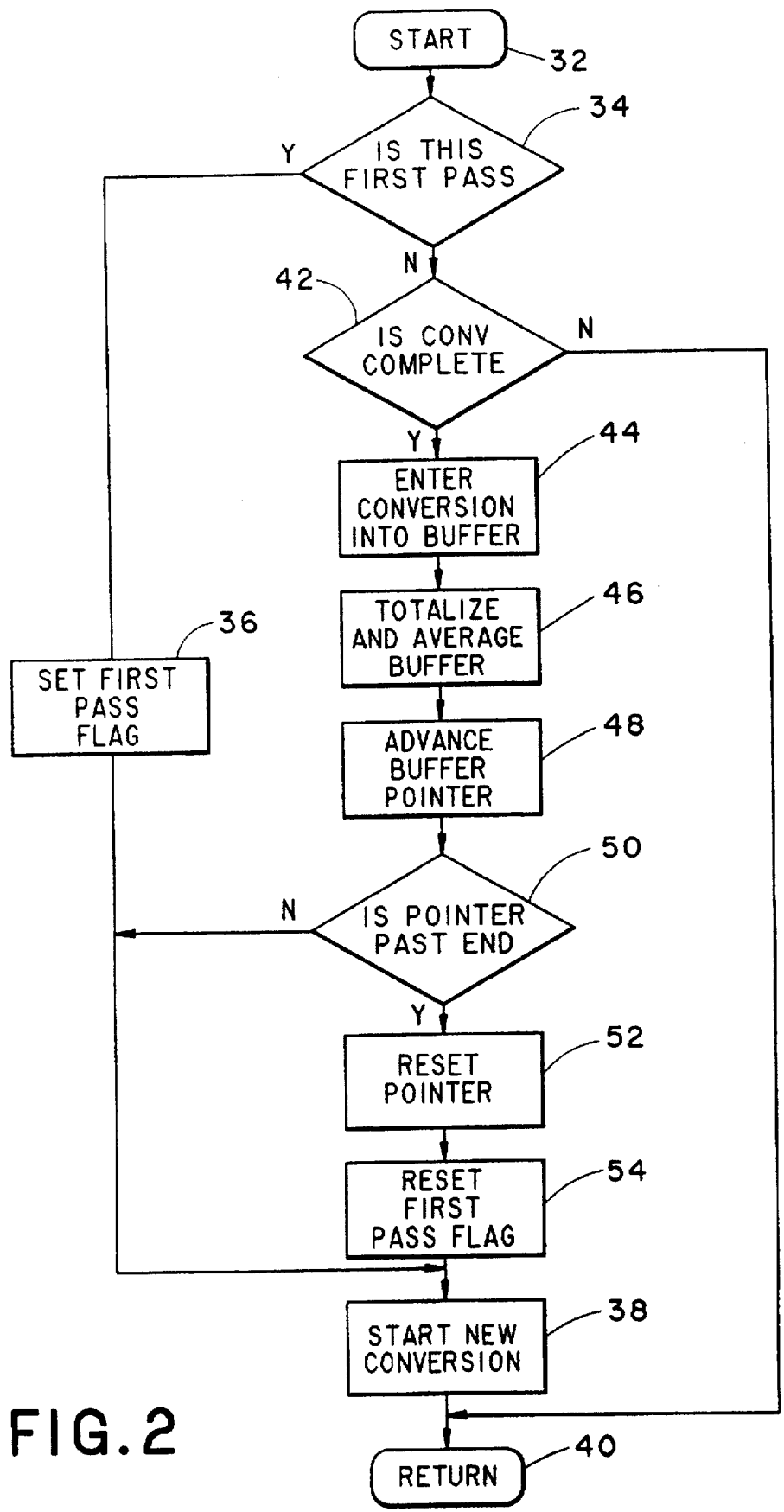
FIG. 2 is a flowchart illustrating the running average calculation method performed by the temperature sensor of FIG. 1.

The method performed by these devices is illustrated as a flowchart in FIG. 2. As shown therein, the routine starts at 30 and it is determined at decision block 34 whether it is the "first pass" in adding raw data from temperature sensor 12 to buffer 18. If it is a first pass, a first pass flag is set at 36, a new A/D conversion is performed at 38 on a temperature related voltage obtained from thermistor 12. Control returns at 40 and then passes through to decision block 42. Once the A/D conversion is complete at block 42, the digitized data point is input into an appropriate memory location within circular buffer 18 at block 44, preferably at that location to which the pointer is currently pointing.

The data points stored in buffer 18 are added together and averaged in block 46. In the case of the first pass, only a single reading is stored in buffer 18 and that value is output as the final temperature reading. After a second data point is obtained and stored, the two readings are averaged on the second pass to produce the calibrated reading, and so forth.

After each average is obtained, the buffer pointer is then advanced to the next memory location at block 48. This pointer typically is simply a register used to store the address of the next memory location into which data is to be stored, and is operated in a manner well known to those having skill in the art.

If the pointer is not advanced past the last buffer memory location at decision block 50, a new A/D conversion is performed at block 38 and the process repeats. Once the pointer is past the end of buffer 18, or advanced beyond the last memory location thereof at decision block 50, the pointer is reset with the address of the first memory location of buffer 18 at block 52, the first pass flag is reset at 54, a new A/D conversion is performed at 38 and the process repeats.

In this manner, a circular buffer is in effect created whereby a new average, in this case a calibrated temperature reading, is calculated each time a new data point is added, the addition of each new data point causing the oldest data point to be overwritten. This creates a running rather than discrete average and results in a more stable and effective method by which the adverse effects of electrical noise can be reduced in an appliance temperature or other type of sensor.

The foregoing discussion discloses and describes an exemplary embodiment of the present invention. One skilled in the art will readily recognize from such discussion, and from the accompanying drawings and appended claims, that certain changes, modifications and variations can be made therein without departing from the spirit and scope of the present invention as defined by the following claims.

What is claimed is:

1. In an appliance having a sensing element electrically coupled to a microprocessor by a transmission line wherein said sensing element produces a series of values each indicative of a sensor measurement, said values being transmitted over said transmission line as a time varying electrical signal, a method for producing an output value averaged to reduce the effects of electrical noise, said method comprising the steps of:

(a) providing a running average circular buffer including a fixed number of memory storage locations, said buffer including a pointer for indicating a memory location into which a sensor measurement indicative value is to be stored, said buffer being electrically coupled to said transmission line;

(b) receiving a signal indicative of said sensor measurement indicative value;

(c) storing said received value in said buffer at said memory location wherein said memory location had previously stored an oldest sensor measurement indicative value, said oldest sensor measurement indicative value being thereby deleted;

(d) incrementing said buffer pointer to a next memory location of said buffer for first-in, first-out storage of-measurement values in said fixed number of memory storage locations;

(e) calculating the average of all values stored in said buffer to produce an average output value; and (f) repeating steps (b)-(e) for each value received from said sensor.

2. The method of claim 1 wherein said sensor signal is an analog signal and said method further includes the step of converting said analog signal to a digital value prior to storing in said buffer memory.

3. The method of claim 1 wherein said sensor signal value is a measurement indicative of a sensed parameter and wherein said method further includes the step of providing means for converting said value into a calibrated reading, wherein said sensor signal value is converted into a calibrated reading prior to being stored in said buffer memory location.

4. The method of claim 3 wherein said sensor is a thermistor, said measurement is a temperature related voltage and said calibrated reading is a temperature.

5. The method of claim 4 wherein said thermistor is utilized to measure the temperature of exhaust air in a clothes dryer.

6. The method of claim 5 wherein said method is utilized to produce an average exhaust air temperature reading to control the application of heat in said clothes dryer.

7. The method of claim 1 further including the step of providing at least one additional memory storage location for storing the results of at least one intermediate calculation in calculating said average.

8. In a clothes dryer having a thermistor adapted to produce a series of voltage values each indicative of the instantaneous temperature of the exhaust air of said dryer, said thermistor being electrically coupled to a microprocessor by a transmission line and adapted to send said voltage values as an analog electrical signal to said microprocessor over said transmission line, a method of producing a series of output values accumulated during a single cycle of dryer operation and averaged to reduce the effects of electrical noise induced in said transmission line, said method comprising the steps of:

(a) producing a running average circular buffer in said microprocessor, said buffer including a fixed number of memory storage locations arranged from first to last and a pointer for indicating the next said memory location into which a value is to be stored;

(b) receiving a temperature indicating voltage value;

(c) converting said voltage value to a digital value;

(d) storing a first digital value in said buffer, said value being stored in the memory location thereof indicated by said pointer;

(e) incrementing said buffer pointer to the next memory location of said buffer, said next memory location being the first memory location when the pointer is at the last memory location for first-in, first-out storage of digital values in the buffer;

(f) storing a second digital value in the buffer in the buffer at a memory location having an oldest stored digital value stored therein, whereby the oldest stored digital value is deleted;

(g) calculating a running average of all digital values stored in said buffer to produce a running averaged output value; and (h) repeating steps (b)-(g) for each received voltage value.

9. The method of claim 8 further including the step of converting said digital value into a calibrated temperature reading wherein said calibrated reading is stored in said buffer at said memory location indicated by said pointer.

10. The method of claim 9 wherein calibration values used to convert said temperature indicative voltage value to a calibrated temperature reading are stored in said microprocessor.

* * * * *